(12) United States Patent
DeYoung et al.

(10) Patent No.: US 7,505,180 B2
(45) Date of Patent: Mar. 17, 2009

(54) OPTICAL CHARACTER RECOGNITION USING DIGITAL INFORMATION FROM ENCODED TEXT EMBEDDED IN THE DOCUMENT

(75) Inventors: Dennis C. DeYoung, Webster, NY (US); Devin J. Rosenbauer, Butler, PA (US)

(73) Assignee: Xerox Corporation, Norwalk, CT (US)

( * ) Notice: Subject to any disclaimer, the term of this patent is extended or adjusted under 35 U.S.C. 154(b) by 603 days.

(21) Appl. No.: 11/274,805

(22) Filed: Nov. 15, 2005

(65) Prior Publication Data

US 2007/0110339 A1    May 17, 2007

(51) Int. Cl.
*G06K 9/18*   (2006.01)
*G06K 9/72*   (2006.01)
*G06K 9/80*   (2006.01)

(52) U.S. Cl. .............. 358/3.28; 358/470; 382/229; 382/310

(58) Field of Classification Search ............... 358/3.28, 358/470; 382/310, 309, 229
See application file for complete search history.

(56) References Cited

U.S. PATENT DOCUMENTS

| | | | |
|---|---|---|---|
| 5,765,176 A | 6/1998 | Bloomberg | 707/514 |
| 6,219,453 B1 * | 4/2001 | Goldberg | 382/310 |
| 6,577,755 B1 | 6/2003 | Lorie | 382/140 |
| 2003/0156753 A1 | 8/2003 | Fan et al. | 382/167 |
| 2005/0123194 A1 | 6/2005 | Fam et al. | 382/167 |

* cited by examiner

*Primary Examiner*—Scott A Rogers
(74) *Attorney, Agent, or Firm*—Alix, Yale & Ristas, LLP

(57) ABSTRACT

A method for performing optical character recognition (OCR) on an image of a document including text includes embedding a physical manifestation of digital information associated with the text on the document. When the document is scanned with a scanning device, the digital information and a digital text file are produced. The digital text file is proofed using the digital information.

25 Claims, 4 Drawing Sheets

ORIGINAL: "THE DOG BIT THE OAR"

36 → 84 xor 104 xor 101 xor 32 xor ... = 79

38 → 79 = 01 00 11 11

01 xor 00 xor 11 xor 11 = 01  —40

FIG. 5

SCANNED: "THE DOG BIT THE CAR"

84 xor ... xor 111 xor 97 xor 114 = 67

67 = 01 00 00 11

01 xor 00 xor 00 xor 11 = 10  —46

FIG. 6

OPTICAL CHARACTER RECOGNITION USING DIGITAL INFORMATION FROM ENCODED TEXT EMBEDDED IN THE DOCUMENT

BACKGROUND

This disclosure relates generally to the field of optical character recognition. More particularly, the present disclosure relates to methods for reducing misidentification of characters during optical character recognition.

The process of obtaining an electronic file of a text message from a physical document bearing the printed text message begins by scanning the document with a device such as optical scanners and facsimile machines. Such devices produce an electronic image of the original document. The output image is then supplied to a computer or other processing device, which performs an optical character recognition ("OCR") algorithm on the scanned image.

The OCR software then processes the image of the scanned document to differentiate between images and text and determine what letters are represented in the light and dark areas. Older OCR systems matched these images against stored bitmaps based on specific fonts. The hit-or-miss results of such pattern-recognition systems helped establish OCR's reputation for inaccuracy. More modern OCR engines may utilize a variety of techniques to analyze the image and to correlate text characters to the image.

For example, neural network technology may be used to analyze the stroke edge, the line of discontinuity between the text characters, and the background. Allowing for irregularities of printed ink on paper, each algorithm averages the light and dark along the side of a stroke, matches it to known characters and makes a best guess as to which character it is. The OCR software then averages or polls the results from all the algorithms to obtain a single reading. Alternatively, the OCR software may use grammar recognition, spell-check, or wavelet conversion, to recognize various characters.

However, conventional OCR algorithms continue to fail on simple distinctions as between, for example, "oar" and "car" or "wet" and "vet" due to information added or removed during copying, printing, or scanning. Even using current systems, optical character recognition cannot efficiently overcome discrepancies between two grammatically appropriate, correctly spelled words.

SUMMARY

There is provided a method for performing optical character recognition (OCR) on an image of a document including text. The method comprises embedding a physical manifestation of digital information associated with the text on the document. When the document is scanned with a scanning device, the digital information and a digital text file are produced. The digital text file is proofed using the digital information.

Embedding a physical manifestation of digital information associated with the text comprises encoding the text with an encoding algorithm to produce the digital information and affixing a physical manifestation of the digital information to the document. The digital information may be hidden on the document using font height, font registration, or font spacing variations. Affixing the physical manifestation of the digital information to the document may comprise printing the text and the digital information in a single printing operation or in separate printing operations.

Proofing the digital text file comprises encoding the digital text file with the encoding algorithm to produce an encoded text. The encoded text is compared to the digital information. If the encoded text matches the digital information, the digital text file is uploaded or transmitted. If the encoded text does not match the digital information, the digital text file is flagged as misidentified.

If the digital text file is flagged as misidentified, any text character with which errors frequently occur is identified as a suspect character. The suspect characters are analyzed to determine a ranking of the suspect characters from the suspect character having the highest probability of an error to the suspect character having the lowest probability of error. At least one candidate alternative character is identified for each suspect character. The alternative characters for each suspect character are analyzed to determine a ranking of the alternative characters from the alternative character having the best probability of being a correct character to the alternative character having the worst probability of being the correct character.

The best alternative character is then substituted for the suspect character having a highest probability of an error, to produce a new digital text file. This digital text file is encoded using the encoding algorithm to produce the encoded text. The encoded text is compared to the digital information. If the encoded text matches the digital information, the digital text file is uploaded or transmitted. If the encoded text does not match the digital information, the digital text file is flagged as misidentified.

If the digital text file is flagged as misidentified: (A) a next-best alternative character is substituted for the suspect character having the highest probability of an error to produce the digital text file; (B) the digital text file is encoded using the encoding algorithm to produce the encoded text; and (C) the encoded text is compared to the digital information. If the encoded text matches the digital information, the digital text file is uploaded or transmitted. If the encoded text does not match the digital information, the digital text file is flagged as misidentified, the method returns to (A) until all identified alternative characters have been substituted for the suspect character having the highest probability of an error.

If the digital text file is flagged as misidentified after all identified alternative characters have been substituted for the suspect character, the best alternative character is substituted for the suspect character having a next-highest probability of an error to produce the digital text file. The digital text file is encoded using the encoding algorithm to produce the encoded text. The encoded text is compared to the digital information. If the encoded text matches the digital information, the digital text file is uploaded or transmitted. If the encoded text does not match the digital information, the digital text file is flagged as misidentified.

If the digital text file is flagged as misidentified: (A) a next-best alternative character is substituted for the suspect character having the next-highest probability of an error to produce the digital text file; (B) the digital text file is encoded using the encoding algorithm to produce the encoded text; and (C) the encoded text is compared to the digital information. If the encoded text matches the digital information, the digital text file is uploaded or transmitted. If the encoded text does not match the digital information, the digital text file is flagged as misidentified, the method returns to (A) until all identified alternative characters have been substituted for the suspect character having the next-highest probability of an error.

BRIEF DESCRIPTION OF THE DRAWINGS

The present disclosure may be better understood and its numerous objects and advantages will become apparent to those skilled in the art by reference to the accompanying drawings in which:

FIG. 5 illustrates operation of a checksum algorithm of a first sentence; and

FIG. 6 illustrates operation of the checksum algorithm of a second sentence.

DETAILED DESCRIPTION

Figure 1:
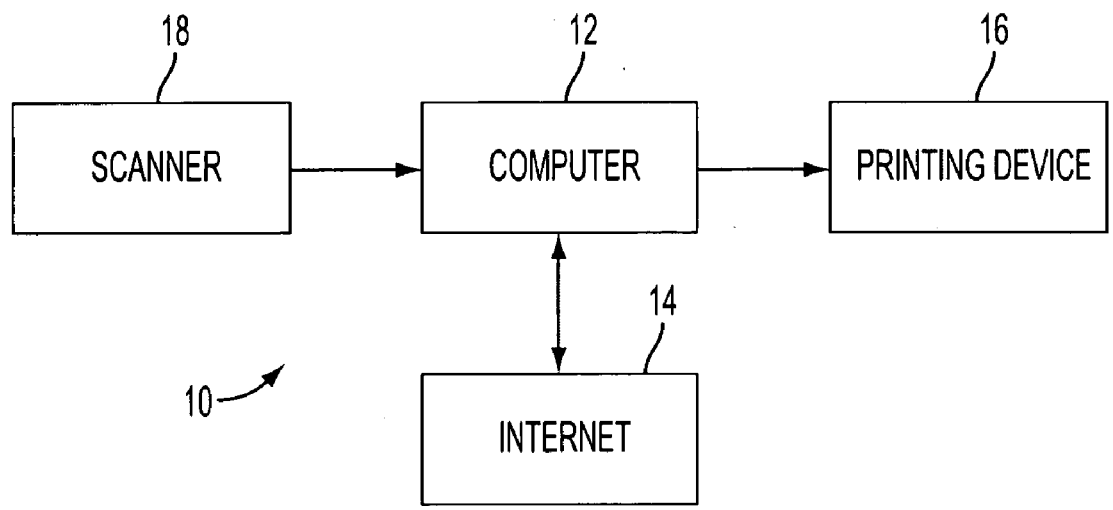
FIG. 1 is a schematic diagram of apparatus for reducing misidentification of characters during optical character recognition.

With reference to the drawings wherein like numerals represent like parts throughout the several figures, and more particularly to FIG. 1, there is shown an apparatus 10 for imbedding digital information in a printed document that may be used, in the event that the printed document is later scanned, to determine whether or not the digital file thus produced contains misidentified characters. The apparatus 10 comprises a computer system 12, including a keyboard, a display and a mouse (none of which are shown), which may be connected to the Internet 14. In addition, the computer system 12 includes a printing device 16 and a scanning device 18, as explained in greater detail below. It should be appreciated that the printing device 16 and the scanning device 18 may be parts of a multifunction device, such as a digital copier. It should also be appreciated that a digital camera may be used in place of the scanning device 18.

Figure 2:
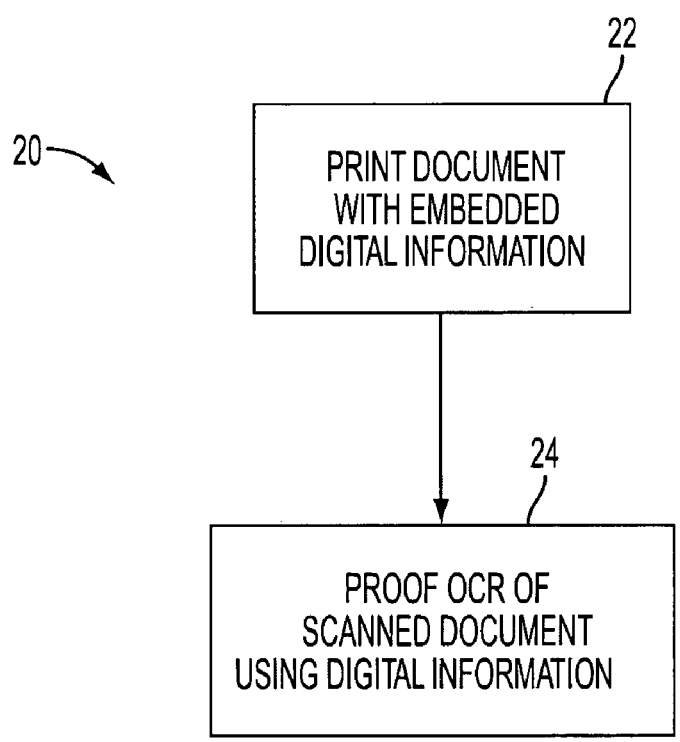
FIG. 2 is a flow diagram for reducing misidentification of characters during optical character recognition.

With reference to FIG. 2, the subject method 20 for reducing misidentification of characters during optical character recognition provides a printed document that is infused with digital information regarding the document. This digital information is used to confirm that the characters comprising the printed document have been correctly identified by an optical character recognition ("OCR") algorithm, should the document be scanned at some later date. Accordingly, the method includes a first, embedding routine 22 for printing a document having a physical manifestation of digital information embedded therein. A second, proofing routine 24 of the method utilizes the digital information to proof the output of the OCR algorithm, if the printed document is scanned at a later date.

Figure 3:
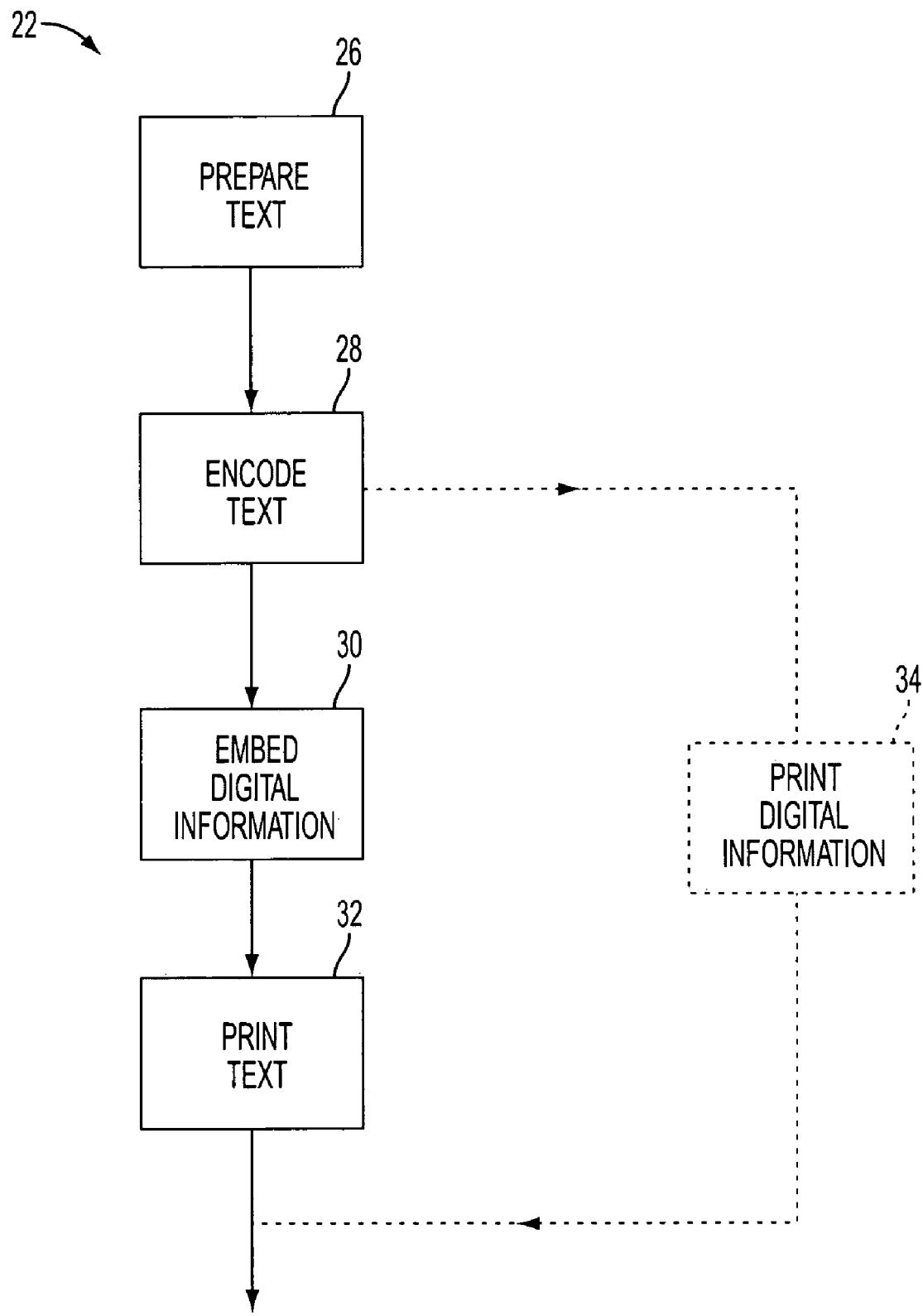
FIG. 3 is a flow diagram of the routine of FIG. 2 for printing a document having embedded digital information.

With reference to FIG. 3, when a document is printed, it is infused with a physical manifestation of the digital information. The term "physical manifestation of the digital information" is hereby defined as a machine readable format affixed to the document, such as through printing, having a capacity sufficient to display the complete data content of the digital information. This information may be hidden using font height, font registration, or font spacing variations. Alternatively, a visible marking may be printed on the page (such as a two-dimensional barcode), or other methods of including digital information on printed material may be used. More specifically, after a document is prepared 26, the embedding routine 22 digitally encodes 28 the text. For example, the digital text is processed by a hash algorithm and/or a checksum algorithm. Since the output of the encoding program is to be printed on the document, the encoding may be as detailed as analog limitations (e.g., line width) allow. The hidden digital information may represent the hash or checksum for any amount of data, from single words, to a line of words, whole sentences, paragraphs, and even whole pages depending on the accuracy required and the overhead that can be tolerated. The digital information may be embedded 30 within the document text and printed 32 along with the document text. Alternatively, the digital information may be printed 34 on the document in a separate printing operation.

FIG. 5 illustrates operation of a checksum algorithm of a sentence. The illustrated algorithm is an arbitrary checksum algorithm chosen as an illustration for its simplicity. Such an algorithm would be inadequate for most text strings, but conveniently works with the example text string. In actual practice, the subject method would use a more complex and reliable method, such as a longer checksum or a message digest/hash, such as MD5 encoding. A longer bit string or a better algorithm may be used for more accurate encoding, but a longer string will be more difficult to reliably encode within a printed string. The implementers of such a system would need to recognize that representing the smallest group of words with the largest hash would provide the best opportunity for fast and accurate error correction.

The illustrated algorithm XORs 36 every byte in the text string, then XORs 38 two-bit segments of the resultant number together, so that ultimately a two-bit number 40 results. In the example shown in FIG. 1, the two-bit checksum 40 is calculated to be 01. The bit string 01 may then be encoded using any method, within this sentence, at or before the time of printing. Optionally, the bit string could be encoded using a 2D-barcode and printed along the side of the page in the same printing operation 32 as the text or in a separate printing operation 34 from the text.

Figure 4:
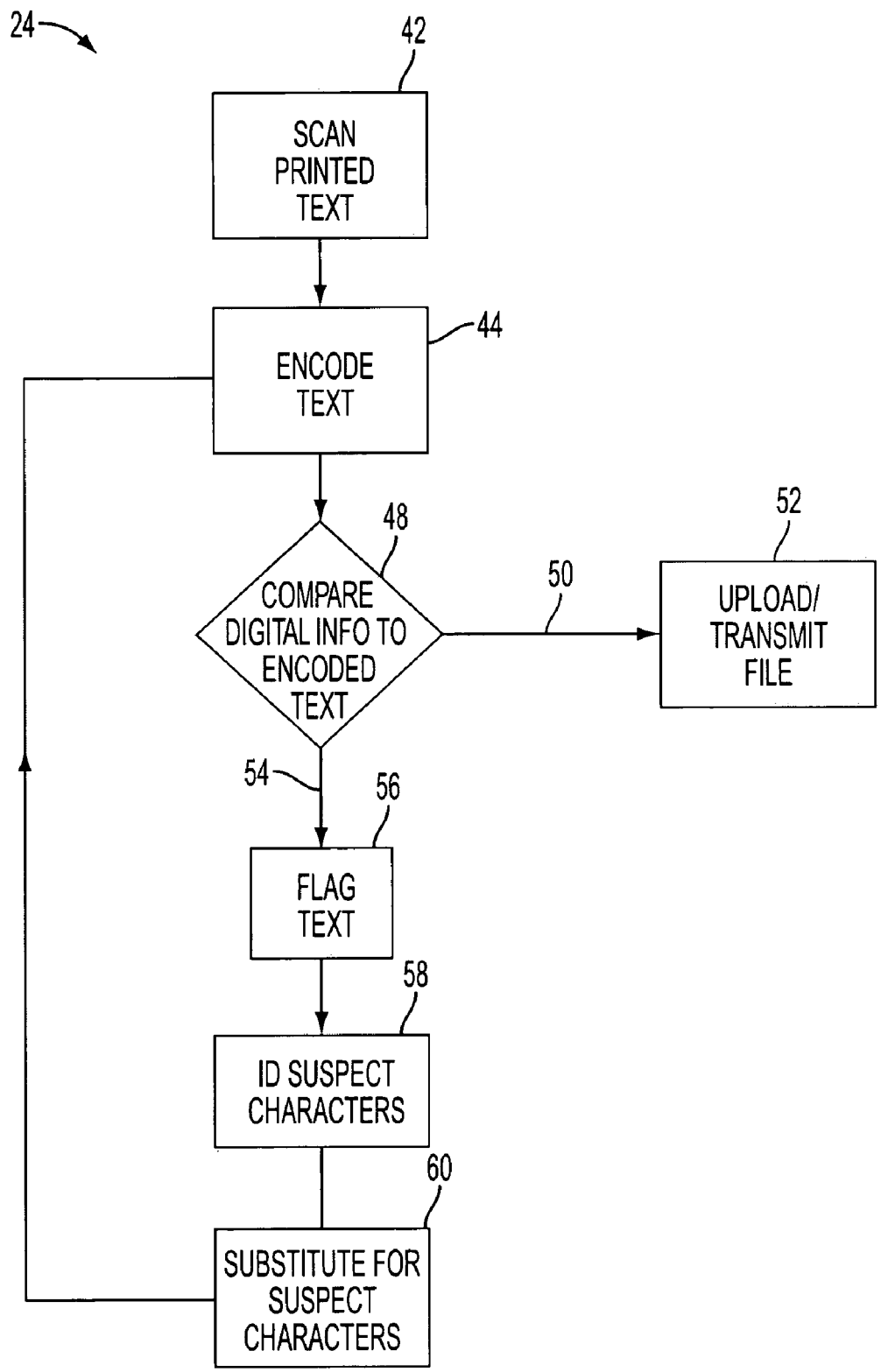
FIG. 4 is a flow diagram of the routine of FIG. 2 for proofing an optical character recognition program output using the digital information embedded in the scanned document.

With reference to FIG. 4, should the document described above be scanned at some later date, the digital information present on the document may be used to proof the output of a OCR algorithm. After the text and digital information on the document have been scanned 42, the proofing routine 24 encodes 44 the text using the same encoding algorithm that was used to produce the embedded digital information. Assume for example, that a part of the "O" in "oar" fails to appear in the file output from the scanner to the OCR program. The loss of a portion of a character can occur through any number of events, including scanner malfunction, erasure/whiteout of the missing portion, etc. As illustrated in FIG. 6, the two-bit checksum 46 of the sample sentence generated by the encoding algorithm is calculated to be 10.

In a conventional OCR algorithm, the corrupted "oar" would be perceived as the word "car". This result would appear to be satisfactory to either a spell check or grammar check routine, and therefore would escape detection in conventional OCR systems. However, the proofing routine compares 48 the encoded text to the digital information. In the event that the encoded text matches 50 the digital information, the OCR system uploads or transmits 52 a digital text file in a conventional manner. In the event that the encoded text does not 54 match the digital information (e.g. the two-bit checksum "10" 46 of the example encoded text does not match the two-bit checksum "01" 40 of the digital information), the proofing routine flags 56 the suspect text (sentence, line, page, etc) as misidentified.

The proofing routine 24 then identifies 58 any character(s) with which errors frequently occur, and candidate alternative characters. For example, a perceived lower-case T could result from a smudge on a lower-case L (or vice-versa), and an O could be transformed into a C (or vice versa). The suspect characters are analyzed to determine a ranking of the suspect characters from the suspect character having the highest probability of an error to the suspect character having the lowest probability of error. At least one candidate alternative character is identified for each suspect character. The alternative characters for each suspect character are analyzed to determine a ranking of the alternative characters from the alternative character having the best probability of being a correct character to the alternative character having the worst probability of being the correct character.

The routine 24 then substitutes 60 the best alternative character for the character having the highest probability of an error. This alternative text is then encoded 44 using the same encoding algorithm that was used to produce the embedded digital information, the encoded text is again compared 48 to the digital information. If the encoded text matches 50 the digital information, the OCR system uploads or transmits 52 a digital text file in a conventional manner. If the encoded text does not match 54 the digital information, and the proofing routine flags 56 the suspect text as misidentified, the routine 24 loops, substituting 60 the next-best alternative character for the suspect character having the highest probability of an error to produce the digital text file, encoding the digital text file using the encoding algorithm, and comparing the encoded text to the digital information, until all identified alternative characters have been substituted for the suspect character having the highest probability of an error.

If all of the likely alternative characters for the character having the highest probability of error have been exhausted and a match between the encoded text and the digital information has not been achieved, the proofing routine identifies 58 the character having the next highest probability of an error, substitutes 60 the next best substitute character, and continues the loop until the encoded text matches 50 the digital information. In the case of the example, the only viable modification which results in a proper checksum is returning the C in "car" to its original character O.

This system 10 and method 20 for reducing misidentification of characters during OCR may be integrated into conventional word processing, printing, and scanning systems. The user would be offered control over the number of verification bits and the type of verification used. Viable verification algorithms include anything from the simple checksum algorithm used in the example to an algorithm capable of outputting an arbitrary-length hash, such as MD5. The number of verification bits available is limited by the encoding method used. For instance, encoding bytes within the spacing of each word limits the number of bits to one less than the number of words. In an average line, this still amounts to a sizeable and robust key for that line.

The performance of the method 20 may be customized in accordance with the user's preferences and limitations imposed by the "receptiveness" of the document for display of the digital information. As mentioned above, the user may elect to encode single words, a line of words, whole sentences, paragraphs, or whole pages. For example, the user may elect to have the "unit of data" represent a significant portion of the document, for example a whole page. This limits the amount of digital information that must be applied to the document as a physical manifestation of the digital information. However, while the subject method will provide notice if an OCR of the scanned page contains an error, it will provide little information on where the error is located on the page. If the user elects to have the unit of data represent a small portion of the document, for example a single word, the subject method will provide notice if an OCR of that word contains an error but will not provide any notice of any other OCR errors that may exist for the scanned page. If each separate word of the page is encoded, the subject method will not only provide notice if an OCR of the scanned page contains an error, it will identify the specific word(s) that contain an error. However, the amount of digital information that must be applied to the document as a physical manifestation of the digital information is proportionally increased and certain documents may not be receptive for the displaying this large amount of extra printed data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for performing optical character recognition (OCR) on an image of a document including text, the method comprising:
    embedding a physical manifestation of digital information associated with the text on the document;
    scanning the document with a scanning device to produce the digital information and a digital text file; and
    proofing the digital text file using the digital information.

2. The method of claim 1 wherein embedding a physical manifestation of digital information associated with the text comprises:
    encoding the text with an encoding algorithm to produce the digital information; and
    affixing a physical manifestation of the digital information to the document.

3. The method of claim 2 wherein the encoding algorithm is a hash algorithm or a checksum algorithm.

4. The method of claim 2 wherein embedding a physical manifestation of digital information associated with the text also comprises hiding the digital information using font height, font registration, or font spacing variations.

5. The method of claim 2 wherein affixing a physical manifestation of the digital information to the document comprises printing the text and the digital information in a single printing operation.

6. The method of claim 2 wherein affixing a physical manifestation of the digital information to the document comprises printing the text and the digital information in separate printing operations.

7. The method of claim 2 wherein proofing the digital text file comprises:
    encoding the digital text file with the encoding algorithm to produce an encoded text;
    comparing the encoded text to the digital information; and
    uploading or transmitting the digital text file if the encoded text matches the digital information, or
    flagging the digital text file as misidentified if the encoded text does not match the digital information.

8. The method of claim 7 wherein if the digital text file is flagged as misidentified, proofing the digital text file also comprises:

identifying any text character or groups of characters with which errors frequently occur as a suspect character;

analyzing the suspect characters to determine a ranking of the suspect characters from the suspect character having the highest probability of an error to the suspect character having the lowest probability of error;

identifying at least one candidate alternative character for each suspect character; and analyzing the alternative characters for each suspect character to determine a ranking of the alternative characters from the alternative character having the best probability of being a correct character to the alternative character having the worst probability of being the correct character.

9. The method of claim 8 wherein proofing the digital text file further comprises:

substituting the best alternative character for the suspect character having a highest probability of an error, to produce the digital text file;

encoding the digital text file using the encoding algorithm to produce the encoded text;

comparing the encoded text to the digital information; and uploading or transmitting the digital text file if the encoded text matches the digital information, or flagging the digital text file as misidentified if the encoded text does not match the digital information.

10. The method of claim 9 wherein if the digital text file is flagged as misidentified, proofing the digital text file further comprises:

(A) substituting a next-best alternative character for the suspect character having the highest probability of an error to produce the digital text file;

(B) encoding the digital text file using the encoding algorithm to produce the encoded text;

(C) comparing the encoded text to the digital information; and uploading or transmitting the digital text file if the encoded text matches the digital information, or flagging the digital text file as misidentified if the encoded text does not match the digital information, and returning to (A) until all identified alternative characters have been substituted for the suspect character having the highest probability of an error.

11. The method of claim 10 wherein if the digital text file is flagged as misidentified after all identified alternative characters have been substituted for the suspect character, proofing the digital text file further comprises:

substituting the best alternative character for the suspect character having a next-highest probability of an error to produce the digital text file;

encoding the digital text file using the encoding algorithm to produce the encoded text;

comparing the encoded text to the digital information; and uploading or transmitting the digital text file if the encoded text matches the digital information, or flagging the digital text file as misidentified if the encoded text does not match the digital information.

12. The method of claim 11 wherein if the digital text file is flagged as misidentified, proofing the digital text file further comprises:

(A) substituting the next-best alternative character for the suspect character having the next-highest probability of an error to produce the digital text file;

(B) encoding the digital text file using the encoding algorithm to produce the encoded text;

(C) comparing the encoded text to the digital information; and uploading or transmitting the digital text file if the encoded text matches the digital information, or flagging the digital text file as misidentified if the encoded text does not match the digital information, and returning to (A) until all identified alternative characters have been substituted for the suspect character having the next-highest probability of an error.

13. The method of claim 2 wherein the encoding algorithm is a hash algorithm and a checksum algorithm.

14. A method for performing optical character recognition (OCR) on an image of a document including text, the method comprising:

encoding the text with an encoding algorithm to produce digital information;

affixing a physical manifestation of the digital information to the document;

scanning the document with a scanning device to produce the digital information and a digital text file;

encoding the digital text file with the encoding algorithm to produce an encoded text; and comparing the encoded text to the digital information;

uploading or transmitting the digital text file if the encoded text matches the digital information, or flagging the digital text file as misidentified if the encoded text does not match the digital information.

15. The method of claim 14 wherein affixing a physical manifestation of digital information associated with the text also comprises hiding the digital information using font height, font registration, or font spacing variations.

16. The method of claim 14 wherein if the digital text file is flagged as misidentified, proofing the digital text file also comprises:

identifying any text character with which errors frequently occur as a suspect character;

analyzing the suspect characters to determine a ranking of the suspect characters from the suspect character having the highest probability of an error to the suspect character having the lowest probability of error;

identifying at least one candidate alternative character for each suspect character; and analyzing the alternative characters for each suspect character to determine a ranking of the alternative characters from the alternative character having the best probability of being a correct character to the alternative character having the worst probability of being the correct character.

17. The method of claim 16 wherein proofing the digital text file further comprises:

substituting the best alternative character for the suspect character having a highest probability of an error, to produce the digital text file;

encoding the digital text file using the encoding algorithm to produce the encoded text;

comparing the encoded text to the digital information; and uploading or transmitting the digital text file if the encoded text matches the digital information, or flagging the digital text file as misidentified if the encoded text does not match the digital information.

18. The method of claim 17 wherein if the digital text file is flagged as misidentified, proofing the digital text file further comprises:

(A) substituting a next-best alternative character for the suspect character having the highest probability of an error to produce the digital text file;

(B) encoding the digital text file using the encoding algorithm to produce the encoded text;

(C) comparing the encoded text to the digital information; and uploading or transmitting the digital text file if the encoded text matches the digital information, or flagging the digital text file as misidentified if the encoded text does not match the digital information, and returning to (A) until all identified alternative characters have been substituted for the suspect character having the highest probability of an error.

19. The method of claim 18 wherein if the digital text file is flagged as misidentified after all identified alternative characters have been substituted for the suspect character, proofing the digital text file further comprises:

substituting the best alternative character for the suspect character having a next-highest probability of an error to produce the digital text file;

encoding the digital text file using the encoding algorithm to produce the encoded text;

comparing the encoded text to the digital information; and uploading or transmitting the digital text file if the encoded text matches the digital information, or flagging the digital text file as misidentified if the encoded text does not match the digital information.

20. The method of claim 19 wherein if the digital text file is flagged as misidentified, proofing the digital text file further comprises:

(A) substituting the next-best alternative character for the suspect character having the next-highest probability of an error to produce the digital text file;

(B) encoding the digital text file using the encoding algorithm to produce the encoded text;

(C) comparing the encoded text to the digital information; and uploading or transmitting the digital text file if the encoded text matches the digital information, or flagging the digital text file as misidentified if the encoded text does not match the digital information, and returning to (A) until all identified alternative characters have been substituted for the suspect character having the next-highest probability of an error.

21. A method for performing optical character recognition (OCR) on an image of a document including text, the method comprising:

encoding the text with an encoding algorithm to produce digital information;

affixing a physical manifestation of the digital information to the document;

scanning the document with a scanning device to produce the digital information and a digital text file;

encoding the digital text file with the encoding algorithm to produce an encoded text;

comparing the encoded text to the digital information to determine if the encoded text matches the digital information; and substituting an alternative text character for a suspect text character if the encoded text does not match the digital information.

22. The method of claim 21 wherein substituting an alternative text character for a suspect text character comprises:

identifying any text character with which errors frequently occur as a suspect character;

analyzing the suspect characters to determine a ranking of the suspect characters from the suspect character having the highest probability of an error to the suspect character having the lowest probability of error;

identifying at least one candidate alternative character for each suspect character;

analyzing the alternative characters for each suspect character to determine a ranking of the alternative characters from the alternative character having the best probability of being a correct character to the alternative character having the worst probability of being the correct character;

substituting the best alternative character for the suspect character having a highest probability of an error, to produce the digital text file;

encoding the digital text file using the encoding algorithm to produce the encoded text;

comparing the encoded text to the digital information; and flagging the digital text file as misidentified if the encoded text does not match the digital information.

23. The method of claim 22 wherein if the digital text file is flagged as misidentified, substituting an alternative text character for a suspect text character further comprises:

(A) substituting a next-best alternative character for the suspect character having the highest probability of an error to produce the digital text file;

(B) encoding the digital text file using the encoding algorithm to produce the encoded text;

(C) comparing the encoded text to the digital information; and uploading or transmitting the digital text file if the encoded text matches the digital information, or flagging the digital text file as misidentified if the encoded text does not match the digital information, and returning to (A) until all identified alternative characters have been substituted for the suspect character having the highest probability of an error.

24. The method of claim 23 wherein if the digital text file is flagged as misidentified after all identified alternative characters have been substituted for the suspect character, substituting an alternative text character for a suspect text character further comprises:

substituting the best alternative character for the suspect character having a next-highest probability of an error to produce the digital text file;

encoding the digital text file using the encoding algorithm to produce the encoded text;

comparing the encoded text to the digital information; and uploading or transmitting the digital text file if the encoded text matches the digital information, or flagging the digital text file as misidentified if the encoded text does not match the digital information.

25. The method of claim 24 wherein if the digital text file is flagged as misidentified, substituting an alternative text character for a suspect text character further comprises:

(A) substituting the next-best alternative character for the suspect character having the next-highest probability of an error to produce the digital text file;

(B) encoding the digital text file using the encoding algorithm to produce the encoded text;

(C) comparing the encoded text to the digital information; and uploading or transmitting the digital text file if the encoded text matches the digital information, or flagging the digital text file as misidentified if the encoded text does not match the digital information, and returning to (A) until all identified alternative characters have been substituted for the suspect character having the next-highest probability of an error.

* * * * *